(12) United States Patent
Chung et al.

(10) Patent No.: US 12,512,265 B2
(45) Date of Patent: Dec. 30, 2025

(54) DIELECTRIC MATERIAL, DEVICE INCLUDING THE SAME, AND METHOD OF PREPARING THE DIELECTRIC MATERIAL

(71) Applicant: KOREA ADVANCED INSTITUTE OF SCIENCE AND TECHNOLOGY, Daejeon (KR)

(72) Inventors: Sung-Yoon Chung, Daejeon (KR); Ji-Sang An, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 267 days.

(21) Appl. No.: 18/339,597

(22) Filed: Jun. 22, 2023

(65) Prior Publication Data

US 2024/0194407 A1    Jun. 13, 2024

(30) Foreign Application Priority Data

Dec. 13, 2022    (KR) .................. 10-2022-0174198

(51) Int. Cl.
*H01G 4/30*    (2006.01)
*C04B 35/468*    (2006.01)
(Continued)

(52) U.S. Cl.
CPC ....... *H01G 4/1227* (2013.01); *C04B 35/4682* (2013.01); *C04B 35/64* (2013.01); *H01G 4/30* (2013.01); *C04B 2235/3236* (2013.01); *C04B 2235/3286* (2013.01); *C04B 2235/3418* (2013.01); *C04B 2235/656* (2013.01); *C04B 2235/768* (2013.01); *C04B 2235/781* (2013.01);
(Continued)

(58) Field of Classification Search
None
See application file for complete search history.

(56) References Cited

U.S. PATENT DOCUMENTS 4,425,556 A * 1/1984 Hanke ................. C04B 35/4682
338/22 R
11,805,699 B2 * 10/2023 Song ....................... C01G 51/66
(Continued)

FOREIGN PATENT DOCUMENTS

EP    2053028 A1 * 4/2009 ........... C04B 35/453
JP    9-270366 A    10/1997
(Continued)

OTHER PUBLICATIONS

Yue Sun, et al., "Effect of Oxygen Vacancy on Electrical Property of Acceptor Doped $BaTiO_3$-$Na_{0.5}Bi_{0.5}TiO_3$-$Nb_2O_5$ X8R Systems", Journal of the America Ceramic Society, 2016, pp. 1-7, DOI: 10.1111/jace.14336 (7 pages).
(Continued)

*Primary Examiner* — Dion R. Ferguson
(74) *Attorney, Agent, or Firm* — Sughrue Mion, PLLC (57) ABSTRACT

Provided are a dielectric material, a device including the same, and a method of preparing the dielectric material. The dielectric material includes a polycrystalline oxide including a plurality of crystal grain bulks and grain boundaries located between the plurality of crystal grain bulks, and the polycrystalline oxide includes an indium dopant in the grain boundaries.

18 Claims, 9 Drawing Sheets

(51) Int. Cl.
*C04B 35/64* (2006.01)
*H01G 4/12* (2006.01)

(52) U.S. Cl.
CPC .... *C04B 2235/785* (2013.01); *C04B 2235/85* (2013.01)

(56) References Cited

U.S. PATENT DOCUMENTS

| | | | | |
|---|---|---|---|---|
| 2006/0088719 | A1* | 4/2006 | Ito | H01G 4/1218 428/701 |
| 2007/0181846 | A1* | 8/2007 | Liufu | C04B 35/62665 501/134 |
| 2008/0009572 | A1* | 1/2008 | Khatua | C09C 1/36 524/160 |
| 2012/0279856 | A1* | 11/2012 | Medvedovski | C04B 35/62685 264/678 |
| 2017/0372841 | A1* | 12/2017 | Kawamura | C04B 35/62655 |
| 2019/0148042 | A1* | 5/2019 | Yun | H01G 4/1281 361/275.3 |
| 2021/0098676 | A1* | 4/2021 | Song | H10N 10/855 |
| 2021/0347697 | A1* | 11/2021 | Badding | C01G 35/006 |
| 2022/0177371 | A1* | 6/2022 | Chung | H01G 4/248 |
| 2024/0194407 | A1* | 6/2024 | Chung | C04B 35/4682 |

FOREIGN PATENT DOCUMENTS

| | | | | |
|---|---|---|---|---|
| KR | 10-2006-0052213 A | | 5/2006 | |
| KR | 10-2018-0001463 A | | 1/2018 | |
| KR | 20190074019 A | * | 6/2019 | |
| KR | 10-2022-0080549 A | | 6/2022 | |
| WO | WO-2022247386 A1 | * | 12/2022 | C04B 35/01 |
| WO | WO-2023151685 A1 | * | 8/2023 | C01G 25/00 |

OTHER PUBLICATIONS

Korean Office Action dated May 9, 2024 in Application No. 10-2022-0174198.

M. N. Rahaman et al., "Grain Boundary Mobility of BaTiO3 Doped with Aliovalent Cations", Journal of the European Ceramic Society, 1998, pp. 1063-1071, vol. 18.

Armand J. Atanacio et al., "Effect of Indium Segregation on the surface versus Bulk Chemistry for Indium-Doped TiO2", Applied Materials & Interfaces, 2012, pp. 6626-6634, vol. 4.

* cited by examiner

DIELECTRIC MATERIAL, DEVICE INCLUDING THE SAME, AND METHOD OF PREPARING THE DIELECTRIC MATERIAL

CROSS-REFERENCE TO RELATED APPLICATION

This application is based on and claims priority under 35 U.S.C. § 119 to Korean Patent Application No. 10-2022-0174198, filed on Dec. 13, 2022, in the Korean Intellectual Property Office, the disclosure of which is incorporated by reference herein in its entirety.

BACKGROUND

1. Field

The disclosure relates to a dielectric material, a device including the same, and a method of preparing the dielectric material.

2. Description of the Related Art

With the continuous demand for reduction in size and increases in capacitance of electronic devices, there is a need for capacitors having a miniaturized size and high capacitance as compared to capacitors in the art. This trend of miniaturized size and high capacitance is remarkable in multi-layered ceramic capacitors (MLCCs). Capacitance of an MLCC is proportional to the number of stacked dielectric layers constituting the MLCC and inversely proportional to thickness of a single layer of the dielectric layers. Accordingly, there is a need to increase the number of stacked dielectric layers while decreasing the thickness of the dielectric layer, for example, to 1 μm or less, to increase capacitance of the MLCC. As materials for dielectric layers, polycrystalline oxides have been widely used.

Dielectric properties of polycrystalline oxides are required to be further improved to implement miniaturization and high-capacitance capacitors. Accordingly, polycrystalline oxides having an aliovalent cation-doped structure have been widely used.

Among them, when doped with cations, perovskite oxides generally have a structure in which the cations are substituted into dodecahedral sites or octahedral sites according to relative ion size rather than into narrow empty interstitial sites of grain boundaries, due to high atomic packing density of the oxides.

However, in dielectric materials formed of polycrystalline oxides and having such a structure, grain boundary migration is not sufficiently suppressed during sintering, and thus there are limits to suppression of the growth of crystal grains. As a result, it is difficult to realize a capacitor having sufficiently improved dielectric properties to implement miniaturization and high-capacitance capacitors.

Therefore, there is still a need to develop a dielectric material having low dielectric loss in a wide frequency region, high temperature stability, and high permittivity under DC bias, and a device including the same, and a method of preparing the dielectric material.

SUMMARY

Provided is a dielectric material having a low dielectric loss in a wide frequency region, high temperature stability, and high permittivity under DC bias.

Provided is a device including the dielectric material.

Provided is a method of preparing the dielectric material.

Additional aspects will be set forth in part in the description which follows and, in part, will be apparent from the description, or may be learned by practice of the presented embodiments of the disclosure.

According to an aspect of the disclosure, a dielectric material includes a polycrystalline oxide including a plurality of crystal grain bulks and grain boundaries located between the plurality of crystal grain bulks, and the polycrystalline oxide includes an indium dopant in the grain boundaries.

According to another aspect of the disclosure, a device includes: a first electrode; a second electrode opposite to the first electrode; and a single-layered dielectric layer or a multi-layered dielectric layer including two or more layers interposed between the first electrode and the second electrode, wherein the dielectric layer includes the above-described dielectric material.

According to another aspect of the disclosure, a method of preparing a dielectric material includes: preparing a polycrystalline oxide powder; mixing the polycrystalline oxide powder with an indium dopant precursor to prepare a mixture; and performing first heat treatment on the mixture in a reducing atmosphere at a temperature of 1300° C. or below to obtain a sintered product.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

Hereinafter, a dielectric material, a device including the same, and a method of preparing the dielectric material according to an embodiment of the present disclosure will be described in detail with reference to the accompanying drawings. Accordingly, it should be apparent to those skilled in the art that the following description of various embodiments of the present disclosure is provided for illustration purpose only and not for the purpose of limiting the present disclosure as defined by the appended claims and their equivalents.

Hereinafter, an element referred to as being "above" or "on" another element may be directly on the other element in contact therewith or intervening elements may also be present. An expression used in the singular encompasses the expression of the plural, unless it has a clearly different meaning in the context. Throughout the specification, the term "include" is intended to indicate that an element do not preclude the other elements but further add and/or intervene another element, unless otherwise stated. As used herein, the term "combination" includes a mixture, an alloy, a reaction product, and the like unless otherwise stated. It will be understood that, although the terms first, second, third, fourth, etc. may be used herein to describe various components, these components should not be limited by these terms. These terms are only used to distinguish one component from another. The term "or" refers to "and/or" unless otherwise stated. As used herein, the term "connected" may refer to direct connection, indirect connection, or indirect communication. As used herein, the terms "an embodiment", "embodiments", and the like indicate that elements described with regard to an embodiment are included in at least one embodiment described in this specification and may or may not present in other embodiments. In addition, it may be understood that the described elements are combined in any suitable manner in various embodiments. Unless otherwise defined, technical and scientific terms used herein have the same meaning as commonly understood by one or ordinary skill in the art to which this application belongs. All patents, patent applications, and other cited references are incorporated herein by reference in their entirety. However, in the event of any conflict or inconsistency between terms used herein and terms of the cited references, the terms used in this specification take precedence over the terms of the cited references. While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modification, variations, improvements, and substantial equivalents.

Figure 1:
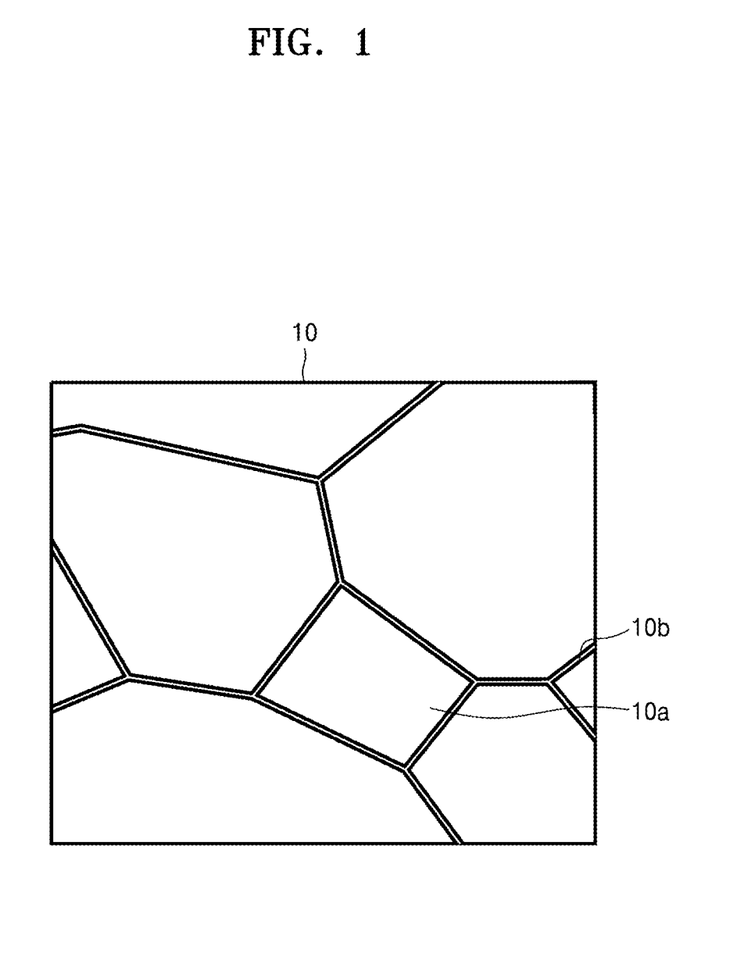
FIG. 1 is a schematic diagram of a dielectric material according to an exemplary embodiment.

FIG. 1 is a schematic diagram of a dielectric material 10 according to an exemplary embodiment.

Referring to FIG. 1, the dielectric material 10 according to an exemplary embodiment may include a polycrystalline oxide including a plurality of crystal grain bulks 10a and grain boundaries 10b located between the plurality of crystal grain bulks 10a. Although FIG. 1 schematically illustrates a part of the dielectric material 10, the plurality of crystal grain bulks 10a surrounded by the plurality of grain boundaries 10b may be aligned along a plurality of rows and/or columns or the plurality of crystal grain bulks 10a surrounded by the grain boundaries 10b may be randomly arranged. As used herein, the term "crystal grain bulk" refers to a non-exfoliated three-dimensional bulk. For example, the crystal grain bulk may include a metal oxide having a permittivity of 100 or more. As used herein, the term "grain boundary" refers to a boundary located between adjacent crystal grains in the polycrystalline oxide.

For example, the polycrystalline oxide may include an oxide represented by Formula 1 below.

$$ABO_3 \qquad \text{Formula 1}$$

In Formula 1,

A includes Ba and may further include at least one element selected from elements of Group 2 of the periodic table, and B includes Ti and may further include at least one element selected from transition metal elements.

Examples of the element selected from Group 2 of the periodic table may include Ca, Sr, or any combination thereof. Examples of the transition metal element may include Zr, Hf, Sn, Ce, or any combination thereof.

For example, the polycrystalline oxide may include $BaTiO_3$, $(Ba_{1-x}Ca_x)TiO_3$, $(Ba_{1-x}Sr_x)TiO_3$, $Ba(Ti_{1-y}Zr_y)O_3$, $Ba(Ti_{1-y}Hf_y)O_3$, $Ba(Ti_{1-y}Sn_y)O_3$, $Ba(Ti_{1-y}Ce_y)O_3$, $(Ba_{1-x}Ca_x)(Ti_{1-y}Zr_y)O_3$, $(Ba_{1-x}Sr_x)(Ti_{1-y}Hf_y)O_3$, $(Ba_{1-x}Sr_x)(Ti_{1-y}Sn_y)O_3$, $(Ba_{1-x}Ca_x)(Ti_{1-y}Ce_y)O_3$, $(Ba_{1-x}Sr_x)(Ti_{1-y}Ce_y)O_3$, or any combination thereof, wherein $0<x<1$ and $0<y<1$.

In general, electrical, mechanical, and thermal properties of the polycrystalline oxide depend on a microstructure thereof. In the microstructure, grain boundaries (GBs) between adjacent crystal grains are important as well as grain size, grain morphology, and grain orientation. An atomic structure and a segregation behavior in grain boundaries vary according to misorientation and inclination angle between two adjacent grains across the grain boundaries. Mobility in grain boundaries may vary according to types and/or concentrations of doped cations.

In general, donor dopants such as Nb, Ta, La, Sm, and Dy generate electrons freely moving in a polycrystalline oxide, and thus charge compensation by formation of ion depletion is difficult to occur in Ba and/or Ti sublattices. Thus, charge compensation of the polycrystalline oxide may also occur in oxygen sublattices and the polycrystalline oxide is easy to become a conductor.

The polycrystalline oxide according to an embodiment includes an indium (In) dopant, as a donor dopant, in the grain boundaries 10b.

The indium (In) dopant may have a structure segregated into the grain boundaries 10b. 80% or more, 85% or more, 90% or more, 95% or more, 99% or more, 99.5% or more, 99.9% or more or 100% of the indium (In) dopant is located around the grain boundaries 10b rather than the crystal grain bulks 10a. Because the indium (In) dopant is included in the grain boundaries of the polycrystalline oxide, electrical properties of the dielectric material are changed and insulating properties may be effectively obtained. The indium (In) dopant may occupy interstices in the grain boundaries 10b.

The indium (In) dopant may occupy square-planar interstices in the grain boundaries 10b, GBs.

Figure 2:
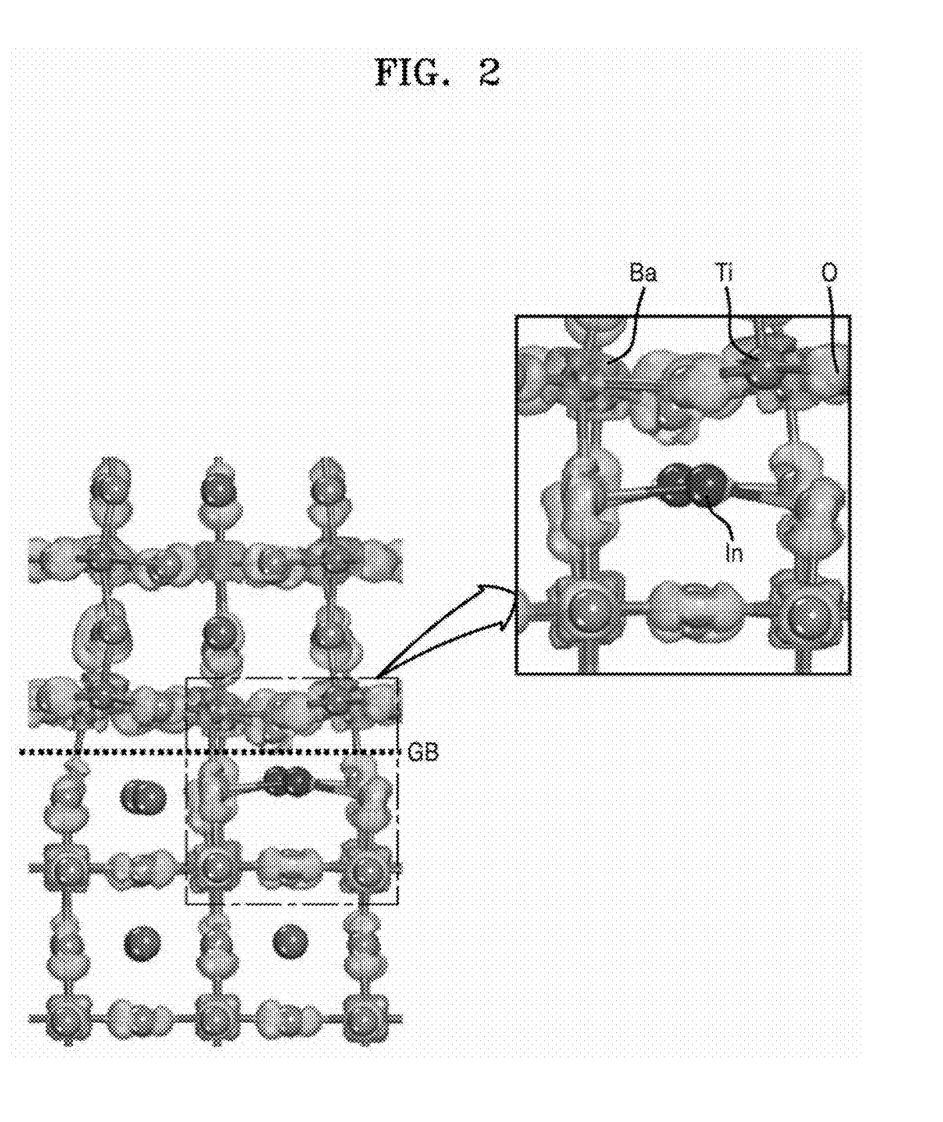
FIG. 2 is a schematic diagram of a geometrical arrangement of atoms of a polycrystalline oxide included in a dielectric material according to an exemplary embodiment.

FIG. 2 is a schematic diagram of geometrical arrangement of atoms of a polycrystalline oxide included in a dielectric material according to an exemplary embodiment.

Referring to FIG. 2, the indium (In) dopant included in the polycrystalline oxide occupies square-planar interstices in the grain boundaries 10b, GBs. The indium (In) dopant has electrostatic interactions with oxygen anions by ionic bonds rather than covalent bonds in the polycrystalline oxide. Because the indium (In) dopant has a sufficiently large ion size compared to oxygen anion, the indium (In) dopant forms a stable ionic bond with oxygen without distortion in oxygen square-planar interstice in the grain boundaries 10b, GBs according to the first law of Pauli.

The indium (In) dopant does not form oxygen (O) vacancies. Charge compensation of the indium (In) dopant may occur in the grain boundaries 10b via barium (Ba) vacancies rather than oxygen (O) vacancies.

As the indium (In) dopant occupies square-planar interstices, the dielectric material 10 including the polycrystalline oxide in which charge compensation occurs via Ba vacancies has a unique chemical heterogeneity limitedly in the grain boundaries 10b. The chemical heterogeneity substantially acts as an obstacle that interferes with grain boundary migration during sintering. As a result, the grain growth is strongly suppressed in the dielectric material 10 during sintering, and thus a microstructure having very densified fine crystal grains may be obtained. Such a microstructure may have improved dielectric properties of a low dielectric loss in a wide frequency, high temperature stability, and high permittivity under DC bias.

The crystal grain bulks 10a may have a grain size of 50 nm to 300 nm. As used herein, the term "grain size" refers to an average diameter of grains. For example, the crystal grain bulks 10a may have a grain size of 50 nm to 290 nm, 50 nm to 280 nm, 50 nm to 270 nm, 50 nm to 260 nm, 50 nm to 250 nm, 50 nm to 240 nm, 50 nm to 230 nm, or 60 nm to 220 nm. Within the grain size ranges of the crystal grain bulks 10a, improved dielectric properties of a low dielectric loss in a wide frequency range, high temperature stability, and high permittivity under DC bias may be obtained.

A content of the indium (In) dopant may be from 0.5 mol % to 10 mol % based on 100 mol % of a total Ti content of the polycrystalline oxide. For example, the content of the indium (In) dopant may be from 0.6 mol % to 9 mol %, from 0.7 mol % to 8 mol %, from 0.8 mol % to 7 mol %, from 0.9 mol % to 6 mol %, or from 1 mol % to 5 mol % based on 100 mol % of the total Ti content of the polycrystalline oxide. With the content of the indium (In) dopant is less than 0.5 mol %, a structure in which the indium (In) dopant is segregated into the grain boundaries 10b may not be formed due to a too small concentration and the grain growth may not be sufficiently suppressed while the dielectric material 10 is sintered, and thus dielectric properties of the dielectric material 10 may deteriorate. With the content of the indium (In) dopant exceeding 10 mol %, excess indium (In) dopant may enter the crystal grain bulks 10a or may generate a large amount of a secondary phase, and thus dielectric properties of the dielectric material 10 may deteriorate.

A width of a portion of the indium (In) dopant segregated into the grain boundaries 10b may be equal to or less than 10 nm. For example, the width of the portion of the indium (In) dopant segregated into the grain boundaries 10b may be 9 nm or less, 8 nm or less, 7 nm or less, 6 nm or less, or 5 nm or less. The indium (In) dopant may effectively improve dielectric properties in the case where the segregated width into the grain boundaries 10b is within the above-described ranges.

The dielectric material 10 may have a dielectric loss of 1% or less in a frequency range of 100 Hz to 10 MHz. For example, the dielectric material 10 may have a dielectric loss of 0.9% or less, 0.8% or less, 0.7% or less, 0.6% or less, 0.5% or less, 0.4% or less, 0.3% or less, 0.2% or less, 0.1% or in a frequency range of 100 Hz to 10 MHz.

The dielectric material 10 may have a variation of less than 10% in relative permittivity under the conditions of applying a DC electric field of 0 V/μm to 5 V/μm. The dielectric material 10 may have a variation of 9% or less, 8% or less, 7% or less, 6% or less, 5% or less, 4% or less, 3% or less, 2% or less, 1% or less, 0.5% or less, or 0.1% or less in relative permittivity under the conditions of applying a DC electric field of 0 V/μm to 5 V/μm.

The dielectric material 10 may have a variation of −15% to +15% in permittivity at 150° C.

The dielectric material 10 may have a variation of −22% to +22% in permittivity at 200° ° C. The dielectric material 10 may have high stability at a high temperature.

A device according to another example embodiment may include: a first electrode; a second electrode opposite to the first electrode; and a dielectric layer interposed between the first electrode and the second electrode, wherein the dielectric layer includes the above-described dielectric material.

The device is not particularly limited as long as the device is used in electric circuits, electronic circuits, electromagnetic circuits, or the like and provides an electrical output in response to an electrical input. The electrical input may be current or voltage and the current may be direct current or alternating current. The electrical input may be input continuously or intermittently at regular intervals. The device may store electrical energy, electrical signals, magnetic energy, and/or magnetic signals. The device may be a semiconductor, a memory, a processor, or the like. The device may be, for example, a resistor, an inductor, a capacitor, or the like.

The device may be, for example, a capacitor.

For example, the device may be a multi-layered ceramic capacitor. The device may include a plurality of first electrodes; a plurality of second electrodes, the plurality of first electrodes and the plurality of second electrodes being alternately arranged; and dielectric layers respectively interposed between each of the first electrodes and each of the second electrodes.

Figure 3:
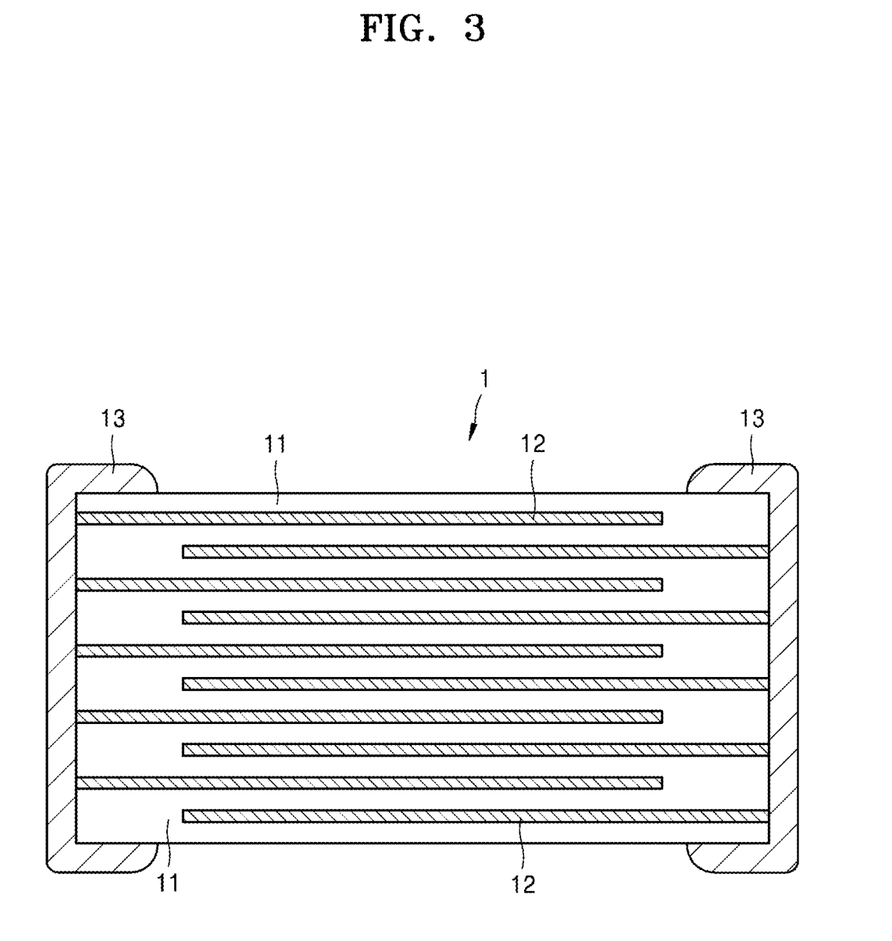
FIG. 3 is a schematic diagram of a multi-layered ceramic capacitor (MLCC) according to an exemplary embodiment.

FIG. 3 is a schematic diagram of a multi-layered ceramic capacitor (MLCC) according to an exemplary embodiment.

Referring to FIG. 3, a multi-layered ceramic capacitor 1 includes a plurality of internal electrodes 12; and dielectric layers 11 located alternately with the plurality of internal electrodes 12. The internal electrodes 12 may be first electrodes or second electrodes. The dielectric layer 11 includes a dielectric material according to an embodiment.

Adjacent internal electrodes 12 are electrically separated from each other by a dielectric layer 11 located therebetween.

By alternately stacking the internal electrodes 12 and the dielectric layers 11 in the multi-layered ceramic capacitor 1, adjacent internal electrodes 12 and a dielectric layer 11 interposed between the internal electrodes 12 act as a unit capacitor. In the multi-layered ceramic capacitor 1, the numbers of the alternately stacked internal electrodes 12 and dielectric layers 11 may be each independently, for example, 2 or more, 5 or more, 10 or more, 20 or more, 50 or more, 100 or more, 200 or more, 500 or more, 1000 or more, 2000 or more, 5000 or more, or 10000 or more.

The multi-layered ceramic capacitor 1 provides a capacitance based on a structure in which the plurality of unit capacitors is stacked. As the number of the stacked internal electrodes 12 and dielectric layers 11 increases, contact areas therebetween are also enlarged, resulting in an increase in capacitance.

The internal electrodes 12 are arranged, for example, to have areas smaller than those of the dielectric layers 11. For example, the plurality of internal electrodes 12 having the same area are stacked such that adjacent internal electrodes 12 are not aligned at the same position along a thickness direction of the multi-layered ceramic capacitor 1 but alternately aligned in the form partially protruding in directions toward both sides of the multi-layered ceramic capacitor 1. The internal electrodes 12 may be formed using, for example, a conductive paste including at least one selected from nickel (Ni), copper (Cu), palladium (Pd), and a palladium-silver (Pd—Ag) alloy. As a method of printing the conductive paste, screen printing or gravure printing may be used, without being limited thereto, and any method commonly used in the art to form an internal electrode may also be used. The internal electrode 12 may have a thickness of, for example, 100 nm to 5 μm, 100 nm to 2.5 μm, 100 nm to 1 μm, 100 nm to 800 nm, 100 nm to 400 nm, or 100 nm to 200 nm.

The plurality of internal electrodes 12 alternately aligned in the form partially protruding toward the both sides of the multi-layered ceramic capacitor 1 are electrically connected to external electrodes 13. The external electrodes 13 is located for example, in a stack structure including the plurality of internal electrodes 12; and the above-described dielectric layers 11 alternately located between the plurality of internal electrodes 12 and is connected to the internal electrodes 12. The multi-layered ceramic capacitor 1 includes external electrodes 13 respectively connected to the internal electrodes 12. The multi-layered ceramic capacitor 1 includes, for example, a pair of external electrodes 13 surrounding both sides of a stack structure formed of the dielectric layers 11 and the internal electrodes 12. The external electrodes 13 may be formed of any material having electrical conductivity, such as metal, and a specific material may be determined in consideration of electrical properties, structural stability, and the like. The external electrodes 13 may have, for example, a multi-layered structure. The external electrodes 13 may include, for example, an electrode layer formed of Ni in contact with the stack structure and the internal electrodes 12, and a plated layer (not shown) formed on the electrode layer. The plated layer may be, for example, a Ni plated layer or a Sn plated layer, in a form where a Ni plated layer and a Sn plated layer are sequentially formed on the electrode layer, or in a form where a Sn plated layer, a Ni plated layer, and a Sn plated layer are sequentially formed on the electrode layer. In addition, the plated layer may include a plurality of Ni plated layers and/or a plurality of Sn plated layers.

The dielectric layer 11 of the multi-layered ceramic capacitor 1 is arranged, for example, to have a larger area than an adjacent internal electrode 12. In the multi-layered ceramic capacitor 1, for example, the dielectric layers 11 respectively interposed between every two adjacent internal electrodes 12 are connected to each other. The dielectric layers 11 respectively interposed between every two adjacent internal electrodes 12 are connected to each other at the sides of the multi-layered ceramic capacitor 1 in contact with the external electrodes 13. For example, the external electrodes 13 may be omitted. In the case of omitting the external electrodes 13, the internal electrodes 12 may protrude from the sides of the multi-layered ceramic capacitor 1 to be connected to a power supply.

In a unit capacitor including adjacent internal electrodes 12 and the dielectric layer 11 interposed therebetween, a thickness of the dielectric layer 11, i.e., a gap between the adjacent internal electrodes 12, may be from 10 nm to 1 μm, 100 nm to 800 nm, 100 nm to 600 nm, or 100 nm to 300 nm. In a unit capacitor including adjacent internal electrodes 12 and the dielectric layer 11 interposed therebetween, the dielectric layer 11 has a dielectric loss of 1% or less in a frequency range of 100 Hz to 10 MHz, a variation of less than 10% in relative permittivity under the conditions of applying a DC electric field of 0 V/μm to 5 V/μm, a variation of −15% to +15% in permittivity at 150° C., and a variation of −22% to +22% in permittivity at 200° C. Because the multi-layered ceramic capacitor 1 includes the dielectric layer 11 with such a less thickness has a low dielectric loss in a wide frequency region, high temperature stability, and high permittivity under DC bias, the multi-layered ceramic capacitor 1 may have increased capacitance and reduced thickness and volume. Therefore, a miniaturized, thin capacitor having high capacitance may be provided.

If required, the multi-layered ceramic capacitor 1 may further include a protective layer (not shown) on at least one of upper and lower surfaces of the dielectric layer 11.

The protective layer may be a single-layer or may have two or more layers. Because an alkali metal such as Na is easily volatilized in the case of heat-treating the dielectric layer 11 in an oxidizing atmosphere, the protective layer prevents the volatilization. The protective layer may include, for example, $BaTiO_3$, $SrTiO_3$, $BaZrO_3$, $BaTiO_3$, $PbTiO_3$, $PbZrO_3$, $SrZrO_3$, $CaTiO_3$, $CaZrO_3$, $BaSnO_3$, $BaFeO_3$, or any combination thereof. However, the embodiment is not limited thereto and an oxide of any metal other than monovalent metal elements available in the art may be included therein.

A method of preparing a dielectric material according to another exemplary embodiment may include: preparing a polycrystalline oxide powder; mixing the polycrystalline oxide powder with an indium dopant precursor to prepare a mixture; and performing first heat treatment on the mixture in a reducing atmosphere at a temperature of 1300° C. or below to obtain a sintered product.

First, a polycrystalline oxide powder is prepared.

For example, the polycrystalline oxide may include an oxide represented by Formula 1 below.

$$ABO_3 \qquad \text{Formula 1}$$

In Formula 1,

A includes Ba and may further include at least one element selected from elements of Group 2 of the periodic table, and B includes Ti and may further include at least one element selected from transition metal elements.

Examples of the element selected from Group 2 of the periodic table may include Ca, Sr, or any combination thereof. Examples of the transition metal element may include Zr, Hf, Sn, Ce, or any combination thereof.

The polycrystalline oxide powder may have an average particle diameter of 50 nm to 300 nm. For example, the polycrystalline oxide powder may have an average particle diameter of 60 nm to 250 nm. In this regard, the average particle diameter refers to "D50 value". As used herein, the "D50 value" refers to a particle diameter corresponding to 50% of the particles in a cumulative distribution curve in which particles are accumulated in the order of particle diameter from the smallest particle to the largest particle and a total number of accumulated particles is 100%. The D50 value may be measured by any method well known in the art, for example, using a particle size analyzer, or using transmission electron microscope (TEM) or scanning electron microscope (SEM) images. Alternatively, the D50 value may easily be obtained by measuring diameters of particles by dynamic light-scattering, counting the number of particles belonging to each particle diameter range via data analysis, and calculating the results. When the average particle diameter of the polycrystalline oxide powder is within the range described above, the grain growth of the polycrystalline oxide is more strongly suppressed during sintering, thereby obtaining a microstructure including very densified fine crystal grains. Such a microstructure may effectively have improved dielectric properties of a low dielectric loss in a wide frequency region, high temperature stability, and high permittivity under DC bias.

Subsequently, the polycrystalline oxide powder is mixed with the indium dopant precursor to prepare a mixture.

In the case of general dopant doping processes or solid solution preparing processes, an oxide is mixed with a dopant element before crystallization of the oxide and the mixture is heat-treated for crystallization. In the method of preparing a dielectric material according to an embodiment, the polycrystalline oxide powder is mixed with the indium dopant to prepare the mixture to form a structure in which the indium dopant is segregated into grain boundaries after the sintering process, specifically, a structure in which the indium dopant occupies the interstices in the grain boundaries, more specifically, a structure in which the indium dopant occupies the square-planar interstices in the grain boundaries.

The indium dopant precursor may include $In_2O_3$. The polycrystalline oxide powder may be mixed with the indium dopant precursor after weighing such that the content of the indium dopant is from 0.5 mol % to 10 mol % based on 100 mol % of the total Ti content of the polycrystalline oxide to prepare a mixture. Then, a silicon dioxide ($SiO_2$) additive is added to the mixture after weighing in accordance with a weight ratio of the polycrystalline oxide powder for easy densification during sintering. The mixture is mechanically milled. The mechanical milling may be ball-milling, airjet-milling, bead milling, roll-milling, planetary milling, hand milling, high energy ball milling, stirred ball milling, vibrating milling, mechanofusion milling, shaker milling, and attritor milling, disk milling, shape milling, nauta milling, nobilta milling, high speed mixing, or any combination thereof. The mechanical milling may be wet milling, for example, using a solvent. For example, in the wet milling using a solvent, ethyl alcohol and the like may be used as the solvent. A mechanical milling time may vary according to milling conditions, but may be, for example, from 1 to 30 hours, e.g., from 5 to 25 hours. By mechanical milling according to the wet milling process, the mixture is more easily dispersed and pulverized, and thus a dielectric material having more improved dielectric properties may be manufactured. The mixture solution is dried after the milling is completed. The drying may be primarily performed on a hot plate and secondarily performed using an oven at 80° C. or higher to completely dry the mixture.

After further pulverizing the dried product, the resultant may be pressed using a mold to produce a molded product to more effectively increase density of the dielectric material during the sintering process. Although a shape of the molded product is not particularly limited, the molded product may have a disc shape. The pressing may be performed, for example, by applying a pressure of 100 MPa to 350 MPa for 1 minute to 30 minutes by cold isostatic pressing.

Subsequently, the mixture is heat-treated in a reducing atmosphere at a temperature of 1300° C. or lower to obtain a sintered product. In the reducing atmosphere, nitrogen ($N_2$) or hydrogen ($H_2$)-nitrogen ($N_2$) may be used. The hydrogen ($H_2$)-nitrogen ($N_2$) may be 0.1% $H_2$-99.9% $N_2$, 0.5% $H_2$-99.5% $N_2$, 1% $H_2$-99% $N_2$, or the like, without being limited thereto. A sintering temperature may be in the range of 1000° C. to 1300° C. to prevent the indium dopant mixed with the polycrystalline oxide powder from entering the crystal grain bulks as well as to maintain the structure segregated into the grain boundaries, specifically, the structure occupying the interstices in the grain boundaries, more specifically, the structure occupying the square-planar interstices in the grain boundaries. A sintering time may be from 30 minutes to 2 hours. When the sintering temperature is higher than 1300° C. and/or the sintering time is longer than 2 hours, diffusion of the indium dopant enters an equilibrium state and the structure may become a solid solution state of the dopant in which the dopant is diffused to the crystal grain bulks rather than the structure in which the dopant is segregated into the grain boundaries. In this case, the dielectric properties may deteriorate. When the sintering temperature is below 1000° C. and/or the sintering time is less than 30 minutes, the density of the dielectric material decreases resulting in a decrease in insulation resistance or deterioration of dielectric properties.

Hereinafter, examples and comparative examples of the present disclosure will be described. However, the following examples are merely presented to exemplify the present disclosure, and the scope of the present disclosure is not limited thereto.

Example 1: $BaTiO_3$ Dielectric Material with Structure in which Indium Dopant is Segregated into Grain Boundary A $BaTiO_3$ nanocrystal powder with a size of 60 nm prepared by hydrothermal synthesis was used. The $BaTiO_3$ nanocrystal powder was mixed with an $In_2O_3$ indium dopant precursor (>99.9%, Sigma Aldrich) such that a molar ratio of Ti of the $BaTiO_3$ nanocrystal powder to the indium dopant is weighed to 99:1. 0.5 wt % of a $SiO_2$ additive (99.5%, Sigma Aldrich) was added to the mixture and the mixture was milled using zirconia balls in ethyl alcohol for 24 hours and dried. The dried mixture was press-molded in a disc-shaped mold, and then pressed by cold isostatic pressing at 200 MPa for 10 minutes to prepare disc-shaped pellets. The disc-shaped pellets were heat-treated in a reducing atmosphere of 0.5% $H_2$-99.5% $N_2$ (500 sccm) at 1220° ° C. for 1 hour to obtain a sintered product.

Example 2: $BaTiO_3$ Dielectric Material with Structure in which Indium Dopant is Segregated into Grain Boundary A $BaTiO_3$ dielectric material having a structure in which an indium dopant is segregated into grain boundaries was prepared in the same manner as in Example 1, except that BaTiO$_3$ nanocrystal powder with a size of 110 nm prepared by hydrothermal synthesis was used.

Example 3: BaTiO$_3$ Dielectric Material with Structure in which Indium Dopant is Segregated into Grain Boundary A BaTiO$_3$ dielectric material having a structure in which an indium dopant is segregated into grain boundaries was prepared in the same manner as in Example 1, except that BaTiO$_3$ nanocrystal powder with a size of 220 nm prepared by hydrothermal synthesis was used.

Comparative Example 1: BaTiO$_3$ Dielectric Material

A BaTiO$_3$ nanocrystal powder with a size of 60 nm (purchased from Samsung Fine Chemicals) prepared by hydrothermal synthesis was used. 0.5 wt % of a SiO$_2$ additive (99.5%, Sigma Aldrich) was added to the BaTiO$_3$ nanocrystal powder and the powder was milled using zirconia balls in ethyl alcohol for 24 hours and dried. The dried powder was press-molded in a disc-shaped mold, and then pressed by cold isostatic pressing at 200 MPa for 10 minutes to prepare disc-shaped pellets. The disc-shaped pellets were heat-treated in a reducing atmosphere of 0.5% H$_2$-99.5% N$_2$ (500 sccm) at 1220° ° C. for 1 hour to obtain a sintered product.

Comparative Example 2: BaTiO$_3$ Dielectric Material with Structure in which Manganese Dopant is Segregated into Grain Boundary A BaTiO$_3$ dielectric material having a structure in which a manganese dopant was segregated into grain boundaries was prepared in the same manner as in Example 1, except that a mixture was prepared by mixing a BaTiO$_3$ nanocrystal powder with a manganese dopant precursor MnO (99%, Alfa Aesar) by weighing such that a molar ratio of Ti of the BaTiO$_3$ nanocrystals to a Mn dopant was 98:2, and the disc-shaped pellets were heat-treated in a reducing atmosphere of 0.5% H$_2$-99.5% N$_2$ (500 sccm) at 1200° ° C. for 1 hour to obtain a sintered product.

Comparative Example 3: BaTiO$_3$ Dielectric Material with Structure in which Iron Dopant is Segregated into Grain Boundary A BaTiO$_3$ dielectric material having a structure in which an iron dopant was segregated into grain boundaries was prepared in the same manner as in Example 1, except that a mixture was prepared by mixing a BaTiO$_3$ nanocrystal powder with an iron dopant precursor Fe$_2$O$_3$ (>98%, Sigma Aldrich) by weighing such that a molar ratio of Ti of the BaTiO$_3$ nanocrystals to a Fe dopant was 99:1, and the disc-shaped pellets were heat-treated in a reducing atmosphere of 0.5% H$_2$-99.5% N$_2$ (500 sccm) at 1200° C. for 1 hour to obtain a sintered product.

Comparative Example 4: BaTiO$_3$ Dielectric Material with Structure in which Cobalt Dopant is Segregated into Grain Boundary A BaTiO$_3$ dielectric material having a structure in which a cobalt dopant was segregated into grain boundaries was prepared in the same manner as in Example 1, except that a mixture was prepared by mixing a BaTiO$_3$ nanocrystal powder with a cobalt dopant precursor CoO (99.99%, Sigma Aldrich) by weighing such that a molar ratio of Ti of the BaTiO$_3$ nanocrystals to a Co dopant was 95:5, and the disc-shaped pellets were heat-treated in a reducing atmosphere of 0.5% H$_2$-99.5% N$_2$ (500 sccm) at 1200° C. for 1 hour to obtain a sintered product.

Comparative Example 5: BaTiO$_3$ Dielectric Material with Structure in which Nickel Dopant is Segregated into Grain Boundary A BaTiO$_3$ dielectric material having a structure in which a nickel dopant was segregated into grain boundaries was prepared in the same manner as in Example 1, except that a mixture was prepared by mixing a BaTiO$_3$ nanocrystal powder with a nickel dopant precursor NiO (99.8%, Sigma Aldrich) by weighing such that a molar ratio of Ti of the BaTiO$_3$ nanocrystals to a Ni dopant was 95:5, and the disc-shaped pellets were heat-treated in a reducing atmosphere of 0.5% H$_2$-99.5% N$_2$ (500 sccm) at 1200° C. for 1 hour to obtain a sintered product.

Comparative Example 6: BaTiO$_3$ Dielectric Material with Structure in which Aluminum Dopant is Segregated into Grain Boundary A BaTiO$_3$ dielectric material having a structure in which an aluminum dopant was segregated into grain boundaries was prepared in the same manner as in Example 1, except that a mixture was prepared by mixing a BaTiO$_3$ nanocrystal powder with an aluminum dopant precursor Al$_2$O$_3$ (99.99%, Sigma Aldrich) by weighing such that a molar ratio of Ti of the BaTiO$_3$ nanocrystals to an Al dopant was 97.5:2.5, and the disc-shaped pellets were heat-treated in a reducing atmosphere of 0.5% H$_2$-99.5% N$_2$ (500 sccm) at 1200° ° C. for 1 hour to obtain a sintered product.

Comparative Example 7: BaTiO$_3$ Dielectric Material with Structure in which Gallium Dopant is Segregated into Grain Boundary A BaTiO$_3$ dielectric material having a structure in which an gallium dopant was segregated into grain boundaries was prepared in the same manner as in Example 1, except that a mixture was prepared by mixing a BaTiO$_3$ nanocrystal powder with a gallium dopant precursor Ga$_2$O$_3$ (>99.99%, Sigma Aldrich) by weighing such that a molar ratio of Ti of the BaTiO$_3$ nanocrystals to a Ga dopant was 97.5:2.5, and the disc-shaped pellets were heat-treated in a reducing atmosphere of 0.5% H$_2$-99.5% N$_2$ (500 sccm) at 1200° ° C. for 1 hour to obtain a sintered product.

Analysis Example 1: Analysis of Grain Boundary of BaTiO$_3$ Dielectric Material Z-contrast HAADF-STEM images were obtained using a transmission electron microscope (Titan cubed G2 60-300 and Spectra Ultra 30-300, Thermo Fisher Scientific) at 300 kV with a spherical aberration corrector (CEOS GmbH). An optimum size of an electron probe was 1 Å or less with a semiangle of 19 mrad. A collection semiangles of the HAADF detector was set to 67.6-200 mrad. An ABF image was obtained at 200 kV with a Spectra Ultra 30-300. For atomic-column-resolved EDS analysis, a Spectra Ultra 30-300 equipped with 4 integrated silicon drift detectors (SDDs) for 4.04 srad solid angle at a beam current of 100 to 150 pA and a JEM-ARM300F2 (JEOL) equipped with a dual SDD (158 mm$^2$) at a beam current of 30μ to 200 pA were used. Chemical composition mapping by EDS at a low magnification was performed using a Talos F200X (Thermo Fisher Scientific) at 200 kV with a beam current of 1.6 nA/cm$^2$.

(1) STEM/EDS Images

Figure 4:
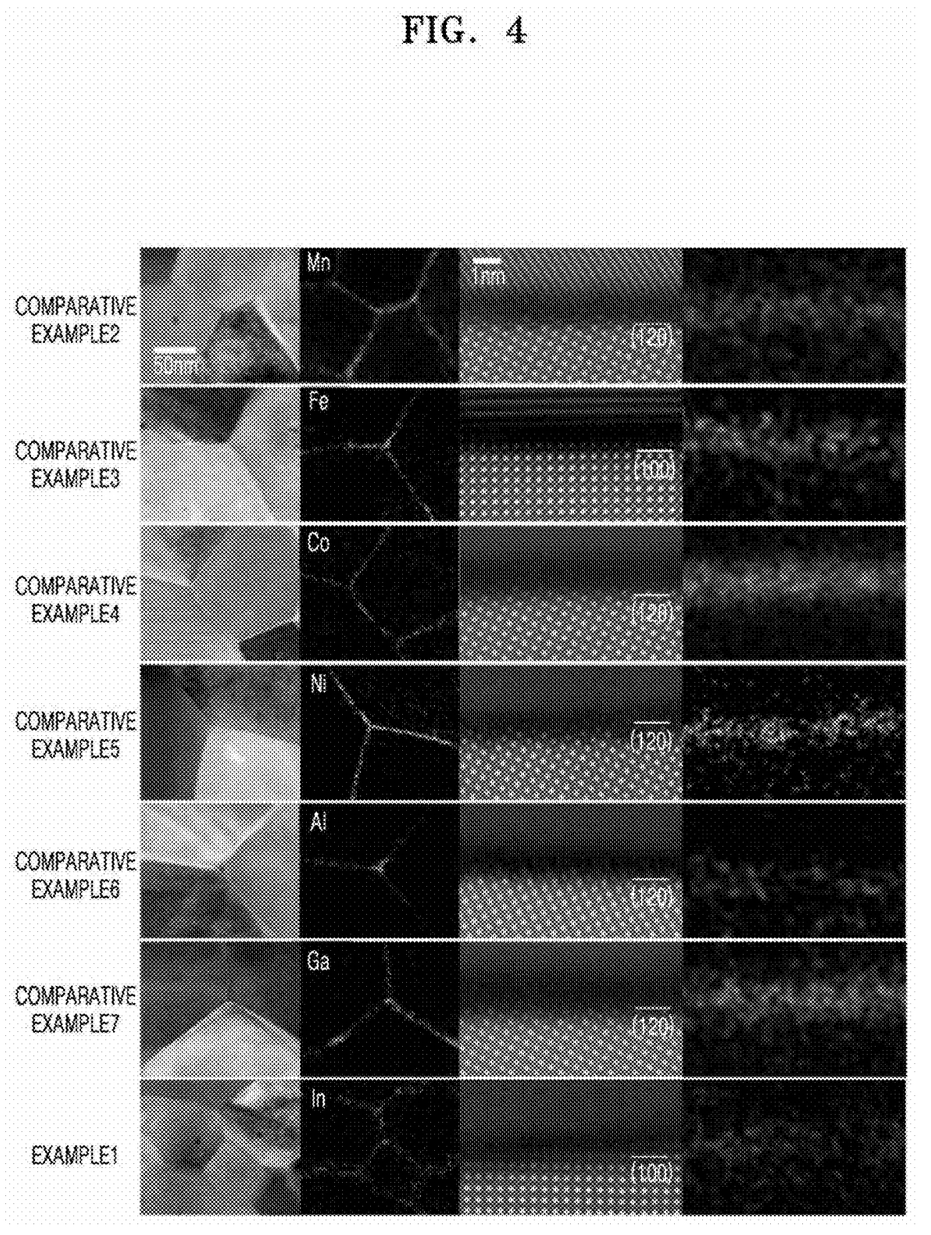
FIG. 4 shows scanning transmission electron microscopy/energy dispersive spectrometer (STEM/EDS) images of grain boundaries (GBs) of $BaTiO_3$ dielectric materials prepared in Example 1 and Comparative Examples 2 to 7.

FIG. 4 shows scanning transmission electron microscopy/energy dispersive spectrometer (STEM/EDS) images of grain boundaries (GBs) of the BaTiO$_3$ dielectric materials prepared in Example 1 and Comparative Examples 2 to 7.

Referring to FIG. 4, it may be confirmed that, in the BaTiO$_3$ dielectric materials prepared in Example 1 and Comparative Examples 2 to 7, each of the indium (In), manganese (Mn), iron (Fe), cobalt (Co), nickel (Ni), aluminum (Al), and gallium (Ga) dopants was observed not in the crystal grain bulks but distributed in the form of segregated into the grain boundaries located between the crystal grain bulks. In addition, it may be confirmed a width of a portion of each dopant segregated into the grain boundaries was within about 5 nm.

(2) Z-Contrast HAADF-STEM Image

Figure 5A:
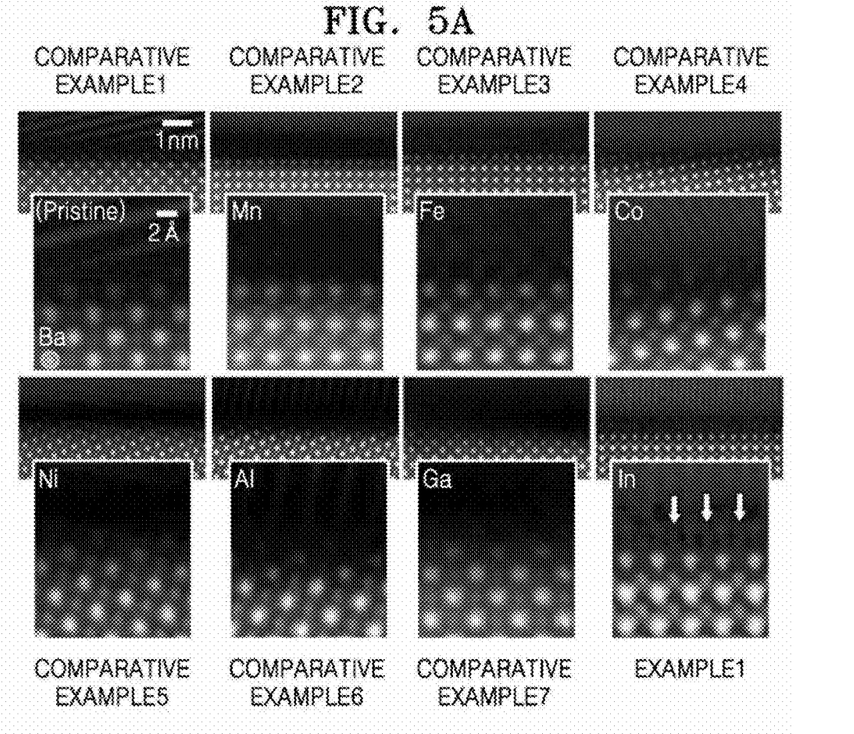
FIG. 5A shows Z-contrast HAADF-STEM images of atomic-level grain boundaries of $BaTiO_3$ dielectric materials prepared in Example 1 and Comparative Examples 1 to 7.
Figure 5B:
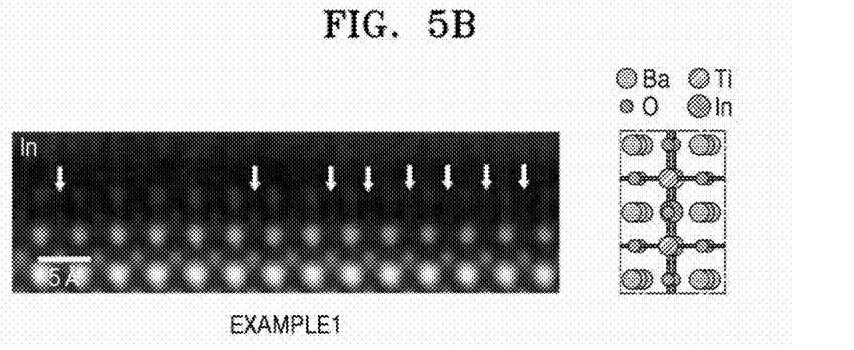
FIG. 5B is an enlarged Z-contrast HAADF-STEM image of atomic-level grain boundaries of the $BaTiO_3$ dielectric material of prepared in Example 1 of FIG. 5A.

FIG. 5A shows Z-contrast HAADF-STEM images of atomic-level grain boundaries of the BaTiO$_3$ dielectric materials prepared in Example 1 and Comparative Examples 1 to 7. FIG. 5B is an enlarged Z-contrast HAADF-STEM image of atomic-level grain boundaries of the BaTiO$_3$ dielectric material prepared in Example 1 of FIG. 5A.

Referring to FIG. 5A, the BaTiO$_3$ dielectric materials prepared in Comparative Examples 1 to 7 did not deviate from ABO$_3$ type perovskite structure. Therefore, it may be confirmed that each of the manganese (Mn), iron (Fe), cobalt (Co), nickel (Ni), aluminum (Al), and gallium (Ga) dopants of the BaTiO$_3$ dielectric materials prepared in Comparative Examples 2 to 7 substituted for a titanium (Ti) site. In comparison therewith, referring to FIGS. 5A and 5B, it may be confirmed that the indium (In) dopant of the BaTiO$_3$ dielectric material prepared in Example 1 occupies the square-planar interstices in the grain boundaries as the geometrical atomic arrangement on the right (white arrows).

(3) HAADF-STEM/Atomic-Column-Resolved EDS and HAADF/ABF-STEM Image

Figure 6A:
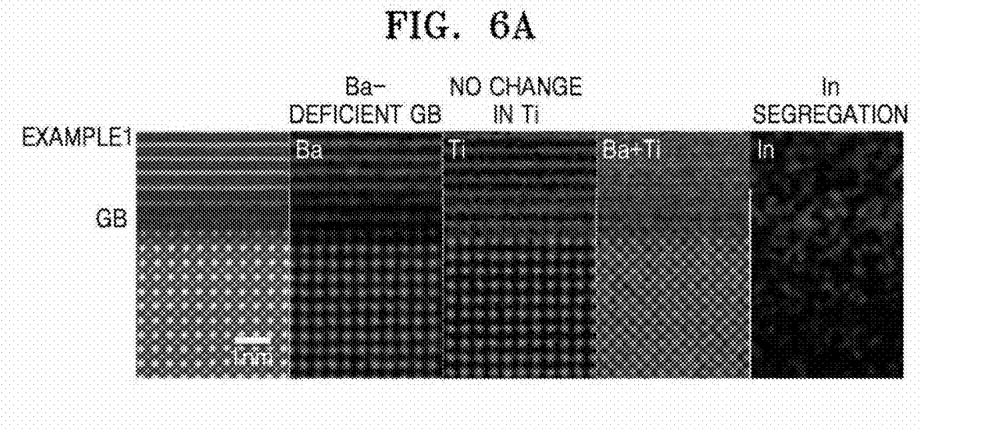
FIG. 6A shows an atomic-level EDS mapping image together with an HAADF-STEM image of grain boundaries of the $BaTiO_3$ dielectric material prepared in Example 1.
Figure 6B:
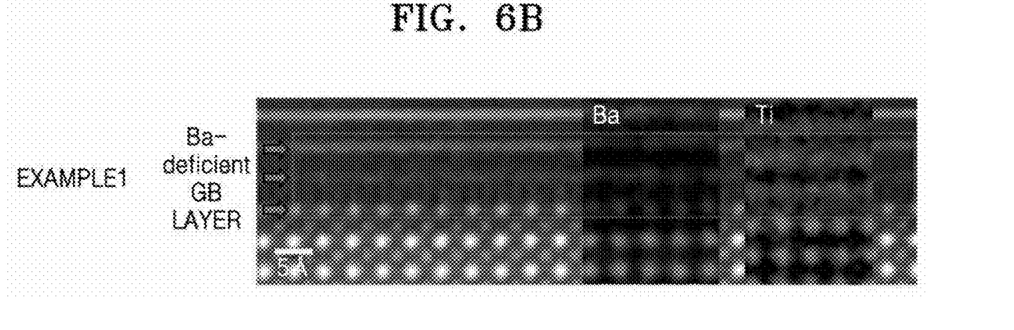
FIG. 6B shows an enlarged HAADF-STEM image and an atomic-level EDS mapping image of barium (Ba) and titanium (Ti) elements present in grain boundaries of the $BaTiO_3$ dielectric material of prepared in Example 1 of FIG. 6A.
Figure 6C:
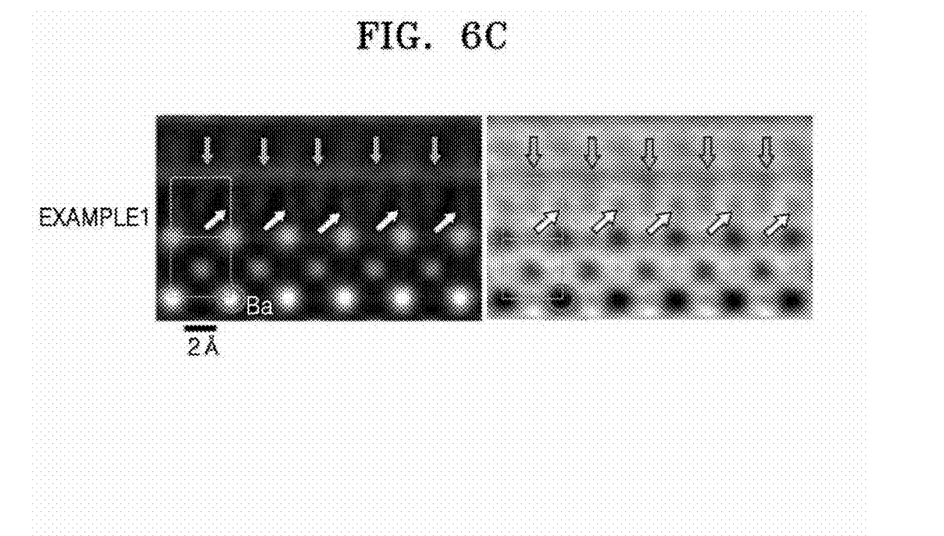
FIG. 6C is an HAADF/ABF-STEM image showing column strength of square-planar interstices in grain boundaries of the $BaTiO_3$ dielectric material prepared in Example 1.
Figure 6D:
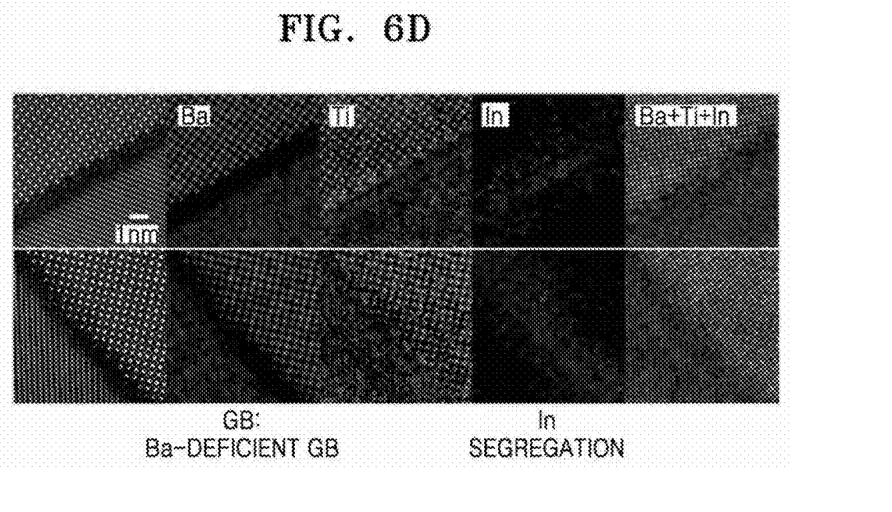
FIG. 6D is an atomic-level EDS mapping image of grain boundaries in the $BaTiO_3$ dielectric material prepared in Example 1.

FIG. 6A shows an atomic-level EDS mapping image together with a HAADF-STEM image of grain boundaries of the BaTiO$_3$ dielectric material prepared in Example 1. FIG. 6B shows enlarged HAADF-STEM image and atomic-level EDS mapping image of barium (Ba) and titanium (Ti) elements present in grain boundaries of the BaTiO$_3$ dielectric material prepared in Example 1 of FIG. 6A. FIG. 6C is a HAADF/ABF-STEM image showing column strength of square-planar interstices in grain boundaries of the BaTiO$_3$ dielectric material prepared in Example 1. FIG. 6D is an atomic-level EDS mapping image of grain boundaries in the BaTiO$_3$ dielectric material prepared in Example 1.

Referring to FIGS. 6A and 6B, it may be confirmed that barium (Ba) is significantly deficient in grain boundaries of the BaTiO$_3$ dielectric material prepared in Example 1 (yellow arrows). It is considered that significantly low signals of barium (Ba) in the grain boundaries of the BaTiO$_3$ dielectric material prepared in Example 1 indicates that charge compensation of indium (In) cations occurs by Ba vacancies. Referring to FIGS. 6C, most column of the square-planar interstices in the grain boundaries of the BaTiO$_3$ dielectric material prepared in Example 1 above exhibits low column strength in the barium (Ba) site (yellow and white arrows). Referring to FIG. 6D, Ba deficiency composition is shown in the grain boundaries of the BaTiO$_3$ dielectric material prepared in Example 1 in the same manner as in the atomic-level EDS mapping image.

Analysis Example 2: Analysis of Grain Size of Crystal Grain Bulk

Figure 7:
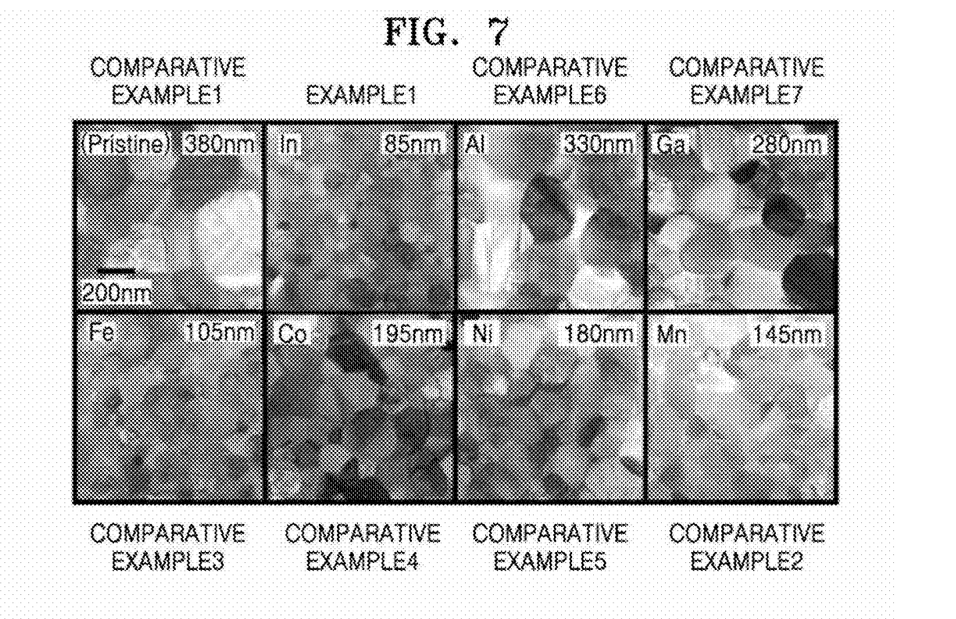
FIG. 7 shows SEM images of grains of crystal grain bulks of $BaTiO_3$ dielectric materials prepared in Example 1 and Comparative Examples 1 to 7.
Figure 8:
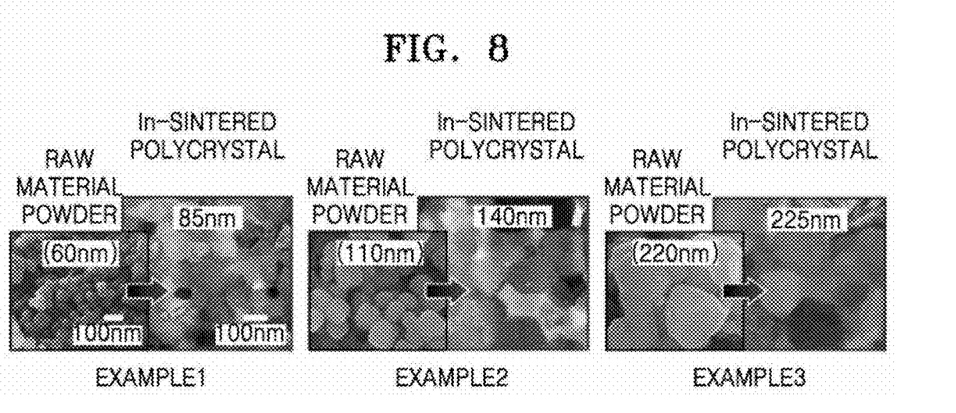
FIG. 8 shows SEM images of grains of crystal grain bulks of $BaTiO_3$ dielectric materials prepared in Examples 1 to 3.

Grain sizes of the crystal grain bulks of the BaTiO$_3$ dielectric materials prepared in Examples 1 to 3 and Comparative Examples 1 to 7 were analyzed using a scanning electron microscope (SEM, SU5000, Hitachi). The results are shown in FIGS. 7 and 8. In this regard, as the grain size of the crystal grain bulks, an average value of sizes of the respective grains, i.e., diameters of the grains, was used.

Referring to FIG. 7, the grain size of the crystal grain bulks of the BaTiO$_3$ dielectric material prepared in Example 1 was 85 nm, which was the lowest compared to the grain sizes (380 nm, 145 nm, 105 nm, 180 nm, 195 nm, 330 nm, and 280 nm) of the crystal grain bulks of the BaTiO$_3$ dielectric materials prepared in Comparative Examples 1 to 7, in the case of being sintered by first and second heat treatment. Based thereon, it may be confirmed that the grain growth of the BaTiO$_3$ dielectric material prepared in Example 1 was strongly suppressed compared to the BaTiO$_3$ dielectric materials prepared in Comparative Examples 1 to 7.

Referring to FIG. 8, when the BaTiO$_3$ dielectric materials prepared in Examples 1 to 3 using the BaTiO$_3$ nanocrystal powders having sizes of 60 nm, 110 nm, and 220 nm were sintered by first and second heat treatment, the grain sizes of the crystal grain bulks of the BaTiO$_3$ dielectric materials were 85 nm, 140 nm, and 225 nm, respectively. Based thereon, it may be confirmed that the grain growth of the BaTiO$_3$ dielectric materials of Examples 1 to 3, which were prepared using the BaTiO$_3$ nanocrystal powder having various sizes, was also strongly suppressed.

Evaluation Example 1: Evaluation of Dielectric Properties of BaTiO$_3$ Dielectric Materials Dielectric properties of the BaTiO$_3$ dielectric materials prepared in Examples 1 to 3 and Comparative Example 1 were evaluated as follows and the results are shown in FIG. 9.

Together with Ag paste as an electrode, BaTiO$_3$ dielectric material samples having a size of 0.5×0.5×3 mm$^3$ were prepared. Relative permittivity and dielectric loss of the prepared samples with respect to frequency and temperature were measured. For measurement, an impedance analyzer (E4990A and E4991B, Keysight) having a voltage of 0.5 Vrms covering a frequency range up to 1 GHz was used. Effective permittivity was recorded at 1 KHz at an amplitude of 5 V using a power device analyzer (TF 2000, axiACCT Systems GmbH) under a DC electric field up to 8 V/μm. Permittivity and dielectric loss of each of the samples with respect to temperature were measured at 1 kHz.

Figure 9:
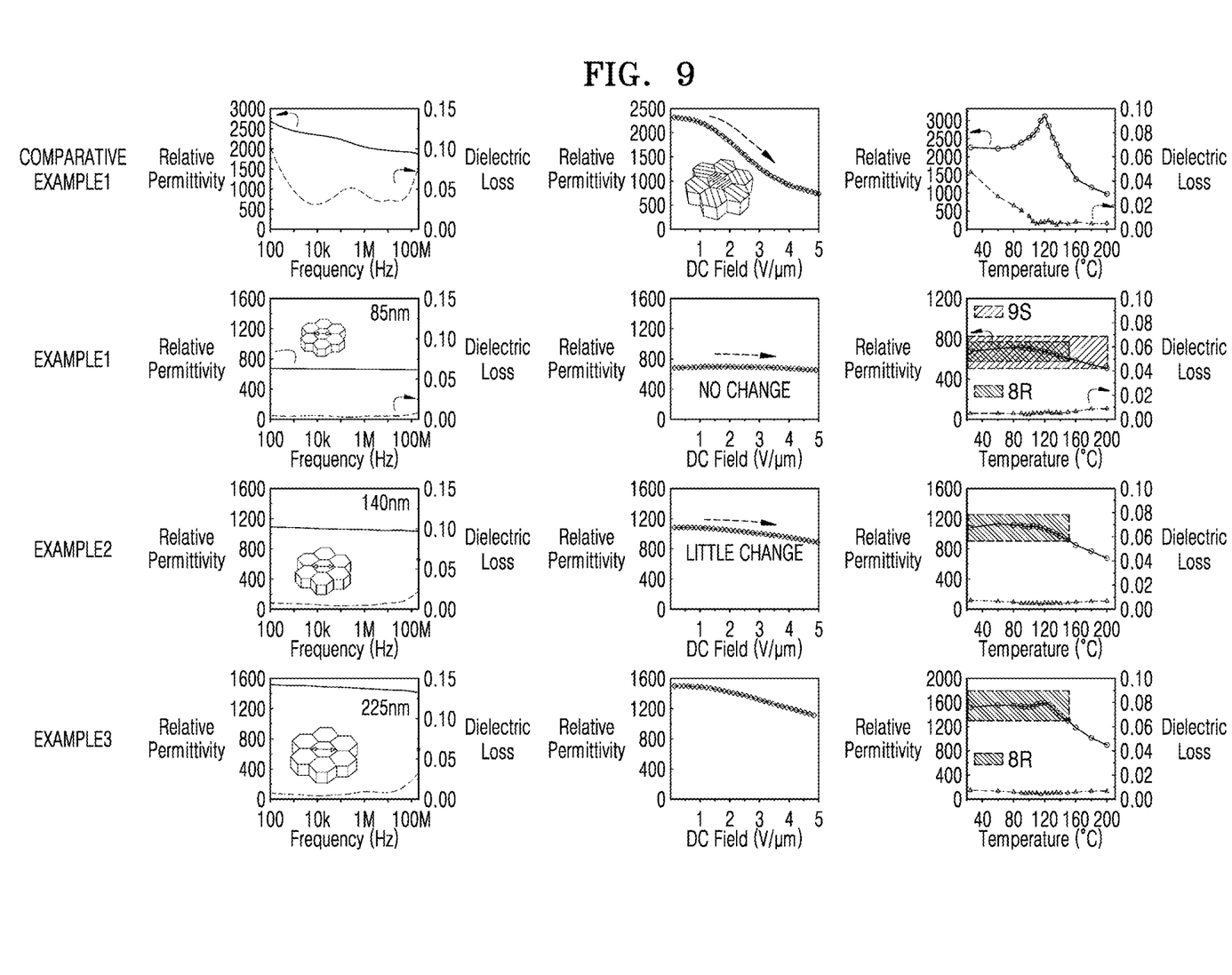
FIG. 9 shows evaluation results of dielectric properties of $BaTiO_3$ dielectric materials prepared in Examples 1 to 3 and Comparative Example 1.

Referring to FIG. 9, the relative permittivity of the BaTiO$_3$ dielectric material prepared in Comparative Example 1 was considerably reduced in a frequency range of 100 Hz to 10 MHz, and a variation in dielectric loss was about 8%. In addition, in the BaTiO$_3$ dielectric material prepared in Comparative Example 1, the relative permittivity significantly decreased under the DC electric field and also significantly decreased according to temperature, and the dielectric loss significantly varied.

In comparison therewith, in the BaTiO$_3$ dielectric material prepared in Example 1, there was no change in relative permittivity in a frequency range of 100 Hz to 10 MHz and under the DC electric field and there was no dielectric loss. The BaTiO₃ dielectric material prepared in Example 1 had a variation of −22% to +22% in permittivity at 200° C. ("9S" level). In the BaTiO₃ dielectric materials prepared in Examples 2 and 3, there was little or a little change in relative permittivity in a frequency range of 100 Hz to 10 MHz and under the DC electric field and a variation in dielectric loss was less than 10%. The BaTiO₃ dielectric materials prepared in Examples 2 and 3 had a variation of −15% to +15% in permittivity at 150° C. ("8R" level).

Based thereon, it may be confirmed that the BaTiO₃ dielectric materials prepared in Examples 1 to 3 had a dielectric loss of less than 1%, temperature stability of about 8R and 9S, and high permittivity of about 103 or more under DC bias. Therefore, the BaTiO₃ dielectric material prepared in Examples 1 to 3 may be applied to devices such as multi-layered ceramic capacitors.

The dielectric material according to an embodiment may include a polycrystalline oxide including a plurality of crystal grain bulks and grain boundaries located between the plurality of crystal grain bulks, wherein the polycrystalline oxide includes an indium dopant in the grain boundaries. The dielectric material has a densified microstructure including fine crystal grains by effectively suppressing grain boundary migration during sintering and may have a low dielectric loss in a wide frequency region, high temperature stability, and high permittivity under DC bias.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A dielectric material comprising
a polycrystalline oxide including a plurality of crystal grain bulks and grain boundaries located between the plurality of crystal grain bulks,
wherein the polycrystalline oxide comprises an indium dopant in the grain boundaries, and
charge compensation of the indium (In) dopant occurs in the grain boundaries via barium (Ba) vacancies rather than oxygen (O) vacancies.

2. The dielectric material according to claim 1, wherein the polycrystalline oxide comprises an oxide represented by Formula 1 below:

$$ABO_3 \qquad \text{Formula 1}$$

wherein in Formula 1,
A comprises Ba and further comprises at least one element selected from elements of Group 2 of the periodic table, and
B comprises Ti and further comprises at least one element selected from transition metal elements.

3. The dielectric material according to claim 1, wherein the polycrystalline oxide comprises $BaTiO_3$, $(Ba_{1-x}Ca_x)TiO_3$, $(Ba_{1-x}Sr_x)TiO_3$, $Ba(Ti_{1-y}Zr_y)O_3$, $Ba(Ti_{1-y}Hf_y)O_3$, $Ba(Ti_{1-y}Sn_y)O_3$, $Ba(Ti_{1-y}Ce_y)O_3$, $(Ba_{1-x}Ca_x)(Ti_{1-y}Zr_y)O_3$, $(Ba_{1-x}Sr_x)(Ti_{1-y}Hf_y)O_3$, $(Ba_{1-x}Sr_x)(Ti_{1-y}Sn_y)O_3$, $(Ba_{1-x}Ca_x)(Ti_{1-y}Ce_y)O_3$, $(Ba_{1-x}Sr_x)(Ti_{1-y}Ce_y)O_3$, or any combination thereof, wherein 0<x<1 and 0<y<1.

4. The dielectric material according to claim 1, wherein the indium dopant occupies interstices in the grain boundaries.

5. The dielectric material according to claim 1, wherein the indium dopant occupies square-planar interstices in the grain boundaries.

6. The dielectric material according to claim 1, wherein the crystal grain bulks have a grain size of about 50 nm to about 300 nm.

7. The dielectric material according to claim 1, wherein a content of the indium dopant is from about 0.5 mol % to about 10 mol % based on 100 mol % of a total Ti content of the polycrystalline oxide.

8. The dielectric material according to claim 1, wherein a width of a portion of the indium dopant segregated into the grain boundaries is 10 nm or less.

9. The dielectric material according to claim 1, wherein the dielectric material has a dielectric loss of 1% or less in a frequency range of 100 Hz to 10 MHz.

10. The dielectric material according to claim 1, wherein the dielectric material has a variation of less than 10% in relative permittivity under conditions of applying a DC electric field of 0 V/μm to 5 V/μm.

11. The dielectric material according to claim 1, wherein the dielectric material has a variation of −15% to +15% in permittivity at 150° C.

12. The dielectric material according to claim 1, wherein the dielectric material has a variation of −22% to +22% in permittivity at 200° C.

13. A device comprising:
a first electrode;
a second electrode opposite to the first electrode; and
a dielectric layer located between the first electrode and the second electrode and having a single-layered structure or a multi-layered structure including two or more layers,
wherein the dielectric layer comprises the dielectric material according to claim 1.

14. The device according to claim 13, wherein the device is a capacitor.

15. The device according to claim 13, wherein the device comprises:
a plurality of first electrodes;
a plurality of second electrodes,
the plurality of first electrodes and the plurality of second electrodes being alternately arranged; and
dielectric layers respectively interposed between each of the plurality of first electrodes and each of the plurality of second electrodes.

16. A method of preparing the dielectric material according to claim 1, the method comprising:
preparing a polycrystalline oxide powder;
mixing the polycrystalline oxide powder with an indium dopant precursor to prepare a mixture; and
performing first heat treatment on the mixture in a reducing atmosphere at a temperature of 1300° C. or below to obtain a sintered product.

17. The method according to claim 16, wherein the polycrystalline oxide comprises an oxide represented by Formula 1 below:

$$ABO_3 \qquad \text{Formula 1}$$

wherein in Formula 1,
A comprises Ba and further comprises at least one element selected from divalent cations, and
B comprises Ti and further comprises at least one element selected from transition metal elements.

18. The method according to claim 16, wherein the indium dopant precursor comprises $In_2O_3$.

* * * * *